(12) United States Patent
Clark et al.

(10) Patent No.: US 6,684,174 B2
(45) Date of Patent: Jan. 27, 2004

(54) WIND GAUGE

(75) Inventors: John M. Clark, Crowley, TX (US); Ian Dwayne Campbell, Saginaw, TX (US); Watson C. K. Chow, Tsuen Wan (HK); David J. Edmondson, Southlake, TX (US); Marco C. Ko, Hong Kong (HK); Alan M. L. Lam, Tai Po (HK); Vincent M. T. Lam, Sheung Shui (HK); Wai-Fong Lee, Li Cheung Uk Est. (HK)

(73) Assignee: RadioShack, Corp., Fort Worth, TX (US)

( * ) Notice: Subject to any disclaimer, the term of this patent is extended or adjusted under 35 U.S.C. 154(b) by 42 days.

(21) Appl. No.: 10/084,865

(22) Filed: Feb. 27, 2002

(65) Prior Publication Data

US 2003/0163278 A1 Aug. 28, 2003

(51) Int. Cl.$^7$ ............................ G01L 11/00; G01F 1/00; G01F 25/00; G01F 1/20
(52) U.S. Cl. ................... 702/138; 702/45; 73/861.18; 73/1.29
(58) Field of Search ............................ 702/138, 45, 47, 702/142; 73/861.18, 861, 1.29

(56) References Cited

U.S. PATENT DOCUMENTS

| | | | |
|---|---|---|---|
| 4,197,752 A | * 4/1980 | Block .......................... 73/755 |
| 5,010,771 A | * 4/1991 | Bruce ....................... 73/861.18 |
| 5,343,744 A | 9/1994 | Ammann | |
| 5,689,114 A | * 11/1997 | Miyazaki et al. ........... 250/343 |
| 5,783,745 A | 7/1998 | Bergman | |
| 5,877,416 A | 3/1999 | Kapartis | |
| 6,032,523 A | * 3/2000 | Smith ....................... 73/170.07 |
| 6,244,114 B1 | 6/2001 | Kowal et al. | |

* cited by examiner

Primary Examiner—John Barlow
Assistant Examiner—Meagan S. Walling
(74) Attorney, Agent, or Firm—Daniel R. Brown; Benman, Brown & Williams (57) ABSTRACT

A wind gauge apparatus and method. An illustrative embodiment includes a microphone positioned to engage wind pressure from a first relative direction and a controller coupled to receive an audio signal from the microphone. The controller compares the audio signal with plural threshold values, representative of wind pressure levels, and determines a first wind pressure level incident upon the microphone. Filtering and gain controls are used to condition the audio signal output from the microphone. Plural microphones are employed to allow that detection of wind direction and magnitude about a compass of directions. Digital signal processing is employed to process data. In an illustrative embodiment, the wind direction and magnitude data are used to recommend a golf club size adjustment and a golf swing direction adjustment to the user, who has taken a measurement of the wind with respect to a reference golf swing direction. In another embodiment, a temperature sensor is added and the controller calculates a wind chill factor.

46 Claims, 6 Drawing Sheets

WIND GAUGE

BACKGROUND OF THE INVENTION

1. Field of the Invention

The present invention relates to wind speed and direction measurements. More specifically, the present invention relates to a portable device and method for measuring wind speed and relative direction as applied to golf club selection and golf swing determination.

2. Description of the Related Art

There are numerous uses for the measurement and indication of wind speed and direction. Traditional meteorological measurements have long included wind speed and direction. Many outdoor activities benefit from wind speed and direction measurements as well. Aviation, boating, construction, recreation, and sports activities all benefit from having current information about wind speed and direction.

Meteorologists have long employed the rotary-cup anemometer and weather vane to measure wind speed and direction, respectively. These are both mechanical devices that are located above local terrain and structures, typically on an elevated pole, that react to air movement to produce the desired information. In addition to mechanical devices, the use of electrically self-heated resistors, hot wires, and hot films as thermal anemometer transducers are known in the prior art. In such devices, a heated resistive element serves as a sensing element. The heated element's physical geometry is used to define its spatial response to impinging airflow. The sensing transducer has a non-zero temperature coefficient of resistance and is maintained at feedback-controlled constant resistance. Transducer element pairs are used to determine direction and in some cases they are used to determine both speed and direction.

The common drawback in the prior art teachings for measuring wind speed and direction is in their application to a portable measurement unit. The rotary anemometer and wind gauge need to be mounted in a fixed position, as they are relatively large and unwieldy for portable applications. In the thermal devices, very large amounts of electrical current are required to maintain the self-heated resistive element. This implies that a large battery and enclosure are required to enable operation of the device. Another limitation of the thermal device is that the resistive element has to be heated up before taking accurate measurement, which is time consuming for each measurement.

Thus there is a need in the art for an apparatus and method for measuring wind speed and direction that is compact, portable, and that does not consume large amounts of power in operation.

SUMMARY OF THE INVENTION

The need in the art is addressed by the apparatus and methods of the present invention. A wind gauge is taught that includes a controller and a first microphone positioned to engage wind pressure from a first relative direction. The controller is coupled to receive a first audio signal from the first microphone, and to compare the first audio signal with plural threshold values, representative of wind pressure levels, to determine a first wind pressure level incident upon the first microphone.

In a specific embodiment, the wind gauge includes a memory having the plural threshold values stored therein. The controller is coupled to recall the plural threshold values from the memory. In another embodiment, a filter is added that has an input coupled to receive the first audio signal from the first microphone and an output that couples a frequency limited portion of the first audio signal to the controller. In a particular embodiment, the filter is a low-pass filter that has a corner frequency of approximately eighty-Hertz. In a specific embodiment, the microphone is a condenser microphone. The plural threshold values may be correlated to a wind speeds, and may be organized as a wind speed map.

In a specific implementation of the present invention, the controller is a digital signal processor. Also, an analog to digital converter is coupled to digitize the first audio signal and output a digital representation of the first audio signal to the digital signal processor. A display is coupled to the controller, or digital signal processor, to display an indicia of the first wind pressure level, which may be the wind speed.

To operate within a wide range of signal levels, a gain stage may be coupled between the microphone and the controller and operated to control the gain of the first audio signal. Thus, the controller determines the signal level of the first audio signal and further controls the gain stage to adjust the gain of the first audio signal into a reasonable operating range.

In a specific implementation that advantageously determines wind direction, as well as magnitude, a second microphone is positioned to engage wind pressure from a second relative direction. The controller is coupled to receive a second audio signal from the second microphone, and to compare the second audio signal with the plural threshold values to determine a second wind pressure level incident upon the second microphone. A housing supports the microphones and the controller, and has a direction indicator thereon which establishes the reference for the relative directions. In addition, a third microphone may be positioned to engage wind pressure from a third relative direction and a fourth microphone may be positioned to engage wind pressure from a fourth relative direction. The controller is then coupled to receive a third and fourth audio signal from the third and fourth microphones. In addition, the controller operates to compare the third and fourth audio signals with the plural threshold values to determine third and fourth wind pressure levels incident upon the third and fourth microphones. In a particular application, the first, second, third, and fourth relative direction are positioned equidistant about a circle, thereby defining four quadrants of directions therebetween. The controller operates to compare the first, second, third, and fourth wind pressure levels and determines which of the four quadrants the wind pressure is impinging upon.

In another specific application of the present invention, the controller processes the first audio signal and the second audio signal to produce a first signal magnitude and a second signal magnitude, respectively. The controller may repetitively sample the audio signals over a predetermined window of time to establish the first signal magnitude and the second signal magnitude. In a refinement, the controller sums the first signal magnitude and the second signal magnitude to determine if a minimum total signal magnitude exists, thereby indicating a minimum measurable wind pressure. Further, the controller may compare the first signal magnitude and the second signal magnitude to determine if a minimum threshold signal magnitude difference exists, thereby indicating the presence of wind. The controller may define a first wind vector as a combination of the first signal magnitude and the first relative direction, and may define a second wind vector as a combination of the second signal magnitude and the second relative direction. Then, the controller can operate to calculate a resultant wind vector based on the first wind vector and the second wind vector.

In a specific embodiment, the wind gauge further includes a housing supporting the microphones and the controller. The housing has a direction indicator thereon which establishes the reference for the relative directions. The controller utilizes the resultant wind vector to calculate a head wind pressure and output a golf club selection adjustment factor. In addition, the controller may utilize the resultant wind vector to calculate a crosswind pressure and output a golf swing direction adjustment factor. In another specific embodiment, the wind gauge further includes a temperature sensor coupled to the controller for sensing ambient temperature, and the controller operates to read the ambient temperature and calculate a wind chill factor based on the ambient temperature and the first wind pressure level.

In an illustrative embodiment of the present invention, the teachings are applied to a golf wind gauge. The golf wind gauge utilizes plural microphones. A housing supports the plural microphones at positions spaced along a compass to engage wind pressure from plural relative directions that define plural segments of the compass therebetween. The housing has a reference direction indicator. Plural low-pass filters are coupled to receive plural audio signals from the plural microphones and output plural frequency limited portions of the plural audio signals. And, plural gain stages are coupled to receive and control the gain of the plural signals. A memory has plural threshold values, correlated to wind speeds, stored therein. Also, plural analog to digital converters are coupled to digitize the plural signals and output digital representations thereof A controller is coupled to receive the digital representations of the plural signals and determine the signal levels thereof by repetitively sampling the plural signals over predetermined windows of time. The controller operates to control the plural gain stages to adjust the gain of the plural signals. The controller is coupled to recall the plural threshold values from the memory and compare the plural signals therewith to determine plural wind pressure levels incident upon the plural microphones. In operation, the controller sums the plural signals to determine if a minimum total signal magnitude exists, thereby indicating a minimum measurable wind pressure. Also, the controller compares the plural signal levels in pair combinations to determine if a minimum threshold signal magnitude difference exists, thereby indicating the presence of wind, and within which of the plural compass segments the wind is impinging upon.

Having determined the segment the wind is heading into, the controller defines two wind vectors as combinations of the two wind pressure levels and the two relative directions adjacent to the one of the plural compass segments into which the wind impinges. Then, the controller calculates a resultant wind vector based on the two wind vectors. A display is coupled to the controller and has an indicia of wind direction, an indicia of golf club strength adjustment, and an indicia of golf swing direction adjustment. The controller activates the indicia of wind direction in accordance with the direction of the resultant vector. It also activates the indicia of golf club strength adjustment in accordance with a component of the resultant vector that is aligned with the reference direction. And, activates the indicia of golf swing direction adjustment in accordance with a component of the resultant vector that is orthogonal to the reference direction.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention teaches a novel approach in the measurement of wind speed and direction. In an illustrative embodiment, condenser microphones are employed as sensor elements to detect wind pressure. Four sensor elements are positioned about a compass to enable the detection of relative wind direction in a hand held device. In the preferred embodiment, the wind gauge processes the wind speed and direction information to output a golf club selection adjustment factor and a golf swing direction adjustment factor. The wind direction measurement and golf stroke recommendations are made with respect to a reference direction, identified by a directional indicator on the illustrative embodiment wind gauge.

In an illustrative embodiment, a condenser microphone is advantageously utilized as the wind pressure-sensing element. A condenser microphone is a device that transforms sound energy into electrical energy. Propagation of sound energy occurs as the displacement of air molecules in the form of air pressure variations. As air pressure changes occur at the microphone input, a proportional change in an electrical signal occurs at the output of the condenser microphone. Similarly, the displacement of air, i.e. wind, will also create a pressure change at the input of the microphone. A condenser microphone has two thin metallic plates placed close to each other that function as a capacitor in an electrical circuit. The back metallic plate of the capacitor is fixed, and the front metallic plate serves as the diaphragm. Wind pressure alters the spacing between the plates, changing the electrical capacitance between them. By placing such a microphone in a suitable circuit, these variations produce and electrical signal that may be amplified and subsequently processed. In an illustrative embodiment, an analog-to-digital converter digitizes the wind pressure signal and a micro-controller interprets the digital signal and makes calculations to determine the wind speed. Further in an illustrative embodiment, four microphone sensors are employed to allow the determination of wind direction, as well as wind speed.

Figure 1:
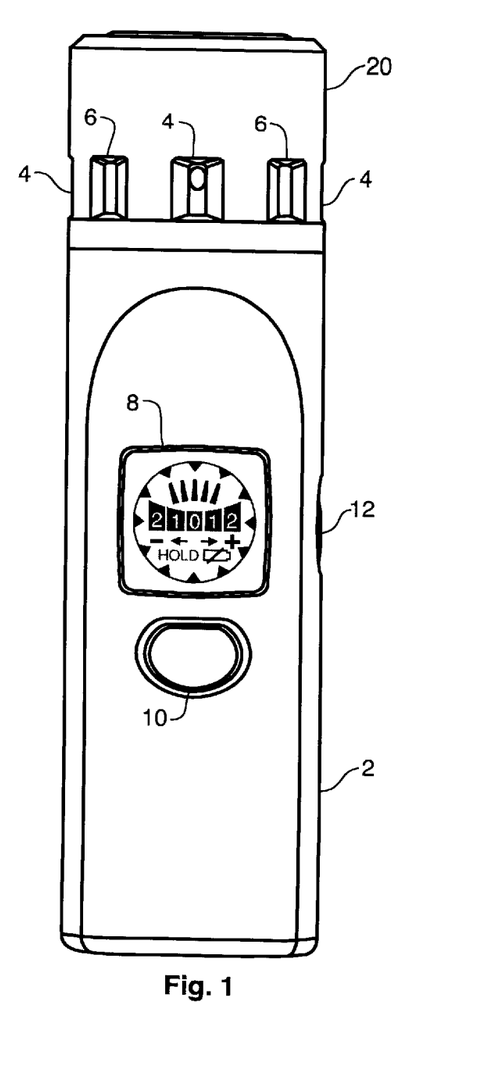
FIG. 1 is a front view of a golf wind gauge in an illustrative embodiment of the present invention.
Figure 2:
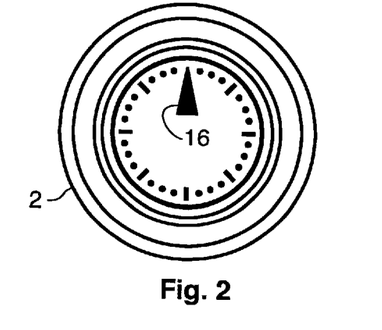
FIG. 2 is a top view of a golf wind gauge in an illustrative embodiment of the present invention.
Figure 3:
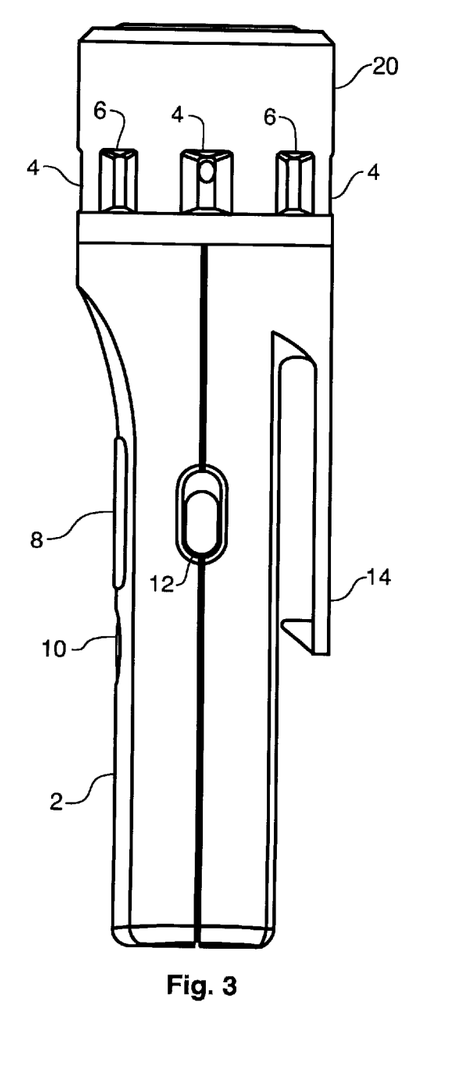
FIG. 3 is a left side view of a golf wind gauge in an illustrative embodiment of the present invention.

Reference is directed to FIG. 1, FIG. 2, and FIG. 3, which are a front view, top view, and left side view, respectively, of an illustrative embodiment golf wind gauge. The illustrative embodiment golf wind gauge is a portable, battery-powered, hand-held device that is carried by a user and employed for making wind measurements from time to time. When employed, the device measures wind speed and relative direction. The measurement is used to produce recommendations for a golf club selection adjustment and a golf stroke direction adjustment based on the wind measurement and a reference direction. The device is contained in a styled housing 2 that has plural vent openings 4 located about a compass of directions near the top of the device. In the illustrative embodiment there are plural faux vent openings 6 that are present primarily for ornamental purposes. The vent openings 4 are placed every ninety degrees about the compass of directions. These locations are also referred to as the twelve o'clock, three o'clock, six o'clock and nine o'clock positions, or, the top, right, bottom and left positions, respectively.

The mechanical design of the housing 2 provides that four condenser microphones are housed in the cylindrical upper portion directly behind the four vent openings 4. The microphones are mounted with rubber cushions so as to minimize any mechanical vibration from the housing 2 itself. The cylindrical shape upper portion of the housing 2 provides a symmetric geometry for smoothing the flow of air about the housing 2. This design minimizes air turbulence on the body of the housing 2 when the wind speed is high, e.g. 20 mph or greater. In operation, the device is held up in the air and a measurement button 10 is depressed to cause the device to commence with a wind measurement and calculation process. When the measurement is made, the user holds the device so that the direction reference arrow 16 is pointed in the intended direction of a subsequent golf stroke. The user can rely upon the reference arrow 16 or the position of the hand and device housing 2 to define the reference direction.

Since the illustrative embodiment golf wind gauge is battery powered, a user activated on-off switch 12 is disposed on the surface of the housing 2 so the device can be turned off when not in use. A storage battery (now shown) is located inside the housing 2. A display 8 is also disposed on the surface of the housing 2, which is used to output information about the wind measurement and golf stroke recommendations. The display employed in the illustrative embodiment is a liquid crystal display that is custom designed for the golf wind gauge functions provided. The details of the display 8 operations will be more fully described hereinafter. A belt-clip 14 is provided so that the device can be conveniently secured to the user's belt between uses.

Figure 4:
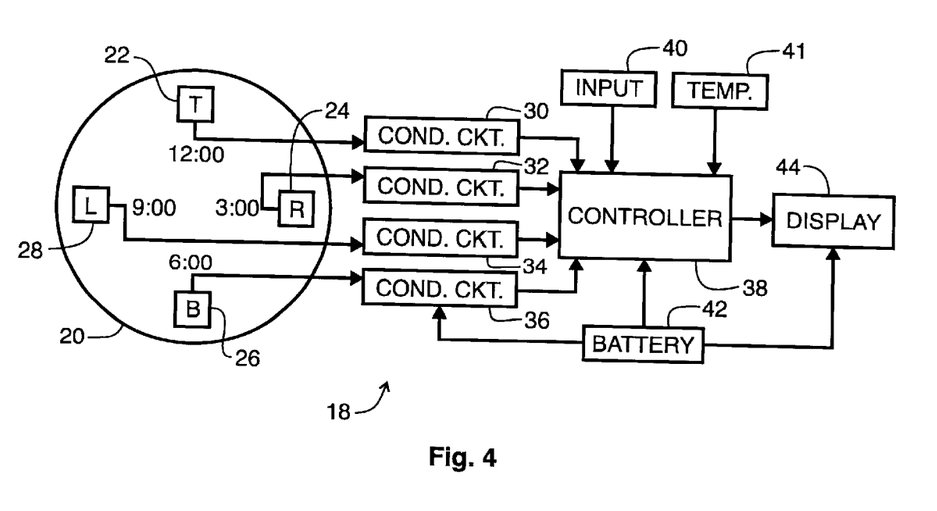
FIG. 4 is a functional block diagram of a golf wind gauge in an illustrative embodiment of the present invention.

Reference is directed to FIG. 4, which is a functional block diagram of a golf wind gauge 18 in an illustrative embodiment of the present invention. The cylindrical upper portion 20 of the housing is diagrammatically illustrated with four sensing elements (condenser microphones) Top 22, Right 24, Bottom 26 and Left 28 arranged such that they are spaced 90 degree relative to the adjacent sensor elements (i.e., at as the twelve o'clock, three o'clock, six o'clock and nine o'clock positions). Each sensor element engages wind pressure from its relative direction and provides an audio signal that ultimately couples to a controller 38, which uses the signals to calculate the wind speed in each relative direction. Each of the sensor elements 22, 24, 26, and 28 are coupled through a conditioning circuit 30, 32, 36, and 34, respectively, prior to being coupled to the controller 38. The conditioning circuits 30, 32, 34 and 36 are used to frequency band limit the audio signal output from the sensing elements 22, 24, 28, and 26 and also to adjust the gain of each signal into a readily usable range. The conditioning circuit design will be more fully described hereinafter. The conditioned signals are coupled to the controller 38 where analysis and mathematical calculations are performed on data gathered from the conditioned audio signals. An input actuator 40 is coupled to the controller 38, and is actuated by a user to cause the illustrative embodiment golf wind gage to commence each wind measurement and calculation process. A display 44 is coupled to and driven by the controller 38 to output information about the wind measurement and calculation process. Electrical power to the conditioning circuits, controller and display is provided by battery 42.

In the illustrative embodiment, the displayed information includes the relative wind directions, a golf club selection adjustment recommendation, a golf swing relative direction adjustment recommendation, and certain other indications, as will be more fully described hereinafter. Of course, those skilled in the art will appreciate that various particularized wind measurement applications can be satisfied by the teachings of the present invention. In each such case, the displayed information and calculation process can be adapted for such particular applications. In a basic application, the display would merely output wind speed and relative direction for analysis and use directly by the user.

Figure 5A:
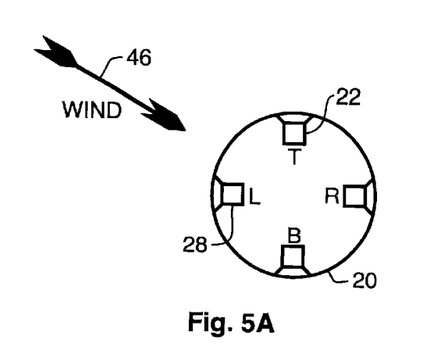
FIGS. 5A and 5B are wind orientation diagrams for a golf wind gauge in an illustrative embodiment of the present invention.
Figure 5B:
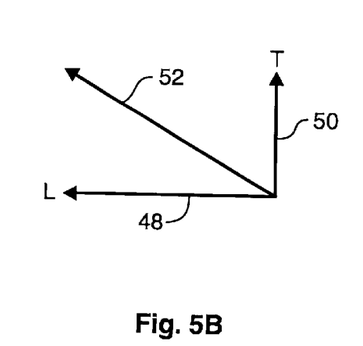

FIGS. 5A and 5B are wind orientation diagrams for the illustrative embodiment described with respect to FIG. 4. The cylindrical upper portion 20 is shown with the sensing elements disposed therein. Wind pressure 46 impinges upon the housing 20 from a relative direction. In this illustration, the relative direction is located in the segment of the compass of directions between the Top sensor 22 and the Left sensor 28. When the controller analyzes the audio signals received during a measurement, the magnitude of the signals from the Top sensor 22 and the Left sensor 28 will be greater than from the other sensors. This basic fact allows the controller to determine within which quadrant of directions the wind is impinging. Having made this determination, the signals from the other sensors can be disregarded. The magnitude of the audio signals from the Top 22 and Left 28 sensors are combined with the relative direction of each sensor to produce two wind vectors 50 and 48, respectively. Trigonometric mathematical calculations are performed on these two vectors 50 and 48 to determine a resultant vector 52 that indicates the actual wind direction and magnitude with respect to the reference direction of the housing.

In the case illustrated in FIG. 5, the Top sensor 22 is aligned with the reference direction (i.e., the direction in which the user wants the golf ball to land) and so the Top sensor vector 50 represents the head wind pressure and the Left sensor vector 48 represents the crosswind pressure. Head wind value is important to a golf club selection adjustment recommendation and crosswind value is important to a golf swing direction adjustment recommendation. Those skilled in the art will appreciate that any number of three or more sensors could be used to accurately orient wind direction within a 360-degree compass. Also, that it is not necessary for one of the sensors be aligned with the reference direction. The compass of directions is segmented by the sensor elements. When there are four sensors placed equidistant about the compass, the segments are quadrants. In any configuration, the controller takes plural reading to determine which two adjacent sensors have the greatest readings, and define, the segment of the compass within which the wind is impinging. Once this determination is made, vector calculations are made to find the resultant wind pressure vector. The resultant vector is then used together with the reference direction to calculate a head wind (aligned with the reference direction) and a crosswind (orthogonal to the reference direction) so that the subsequent golf stroke calculations can be made. Other applications of the teachings herein would make similar vector calculations, dependent upon the particular application.

Figure 6:
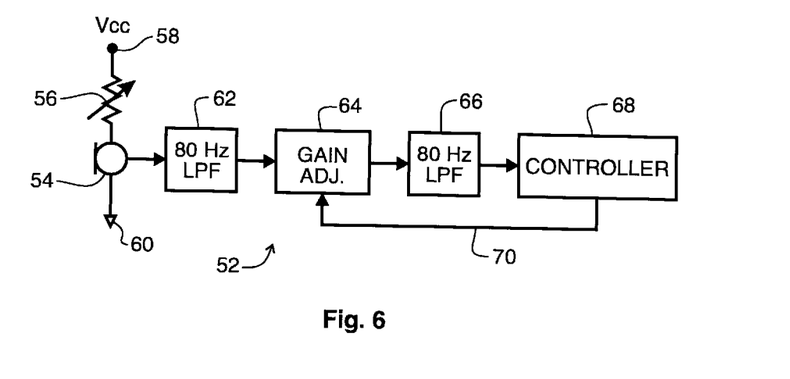
FIG. 6 is a schematic diagram of the input signal conditioning circuit for a golf wind gauge in an illustrative embodiment of the present invention.

Reference is directed to FIG. 6, which is a schematic diagram of the input signal conditioning circuit 52 for a golf wind gauge in an illustrative embodiment of the present invention. FIG. 6 illustrates the basic sensor element and conditioning circuit used in the illustrative embodiment for measuring the wind speed. During a wind measurement, there are air pressure fluctuations created by wind in front of the condenser microphone 54. The microphone 54 outputs and audio band electrical signal with energy content at various frequencies in the audio band. Since a condenser microphone 54 is used in the illustrative embodiment, a bias adjusting potentiometer 56 is disposed between the supply voltage 58 and the microphone 54 to equalize the bias among the plural microphones in the system. The potentiometer 56 controls the voltage bias to the microphone, with respect to the ground potential 60.

A frequency limited portion of the audio signal output from the microphone 54 passes through an eighty-Hertz, second-order, low-pass filter 62, while other frequencies are attenuated in the filter 62. The filter thus removes unwanted audio energy from the signal, such as background noises, human voices and other higher frequency audio sources in the vicinity of the wind measurement area. Since the magnitude of the audio signal output from a condenser microphone 54 will vary from a few millivolts to several hundred millivolts, depending on sound pressure levels, a gain adjustment circuit 64 is provided to attenuate the signal if necessary. When the controller 68 determines that the signal magnitude is too great, it increases the attenuation of the signal in the gain adjusting circuit 64 through feedback path 70. To further improve noise rejection of the signal conditioning circuit 52, another second-order, eighty-Hertz, low-pass filter 66 is provided between the gain adjusting circuit 64 and the controller 68. In the illustrative embodiment, the analog signal is first digitally sampled by an analog to digital converter, which is illustrated as an internal function of controller 68 in FIG. 6.

Respecting the circuit topology of the signal conditioning circuit in FIG. 6, those possessing ordinary skill in the art will appreciate that many designs can be employed to enable the teachings herein. While the illustrative embodiment employs dual second-order, low-pass filters deployed using analog operational amplifiers, higher order analog filters or digital filters can be used as well. Cost, size and available technologies primarily dictate the type of filter used. The operational environment and ambient noise considerations are important in making filter design choices as well. The illustrative embodiment employs a variable attenuation circuit in the gain adjustment stage. Those skilled in the art will appreciate that a variable gain amplification circuit could also be used, in addition to other gain control topologies.

Figure 7:
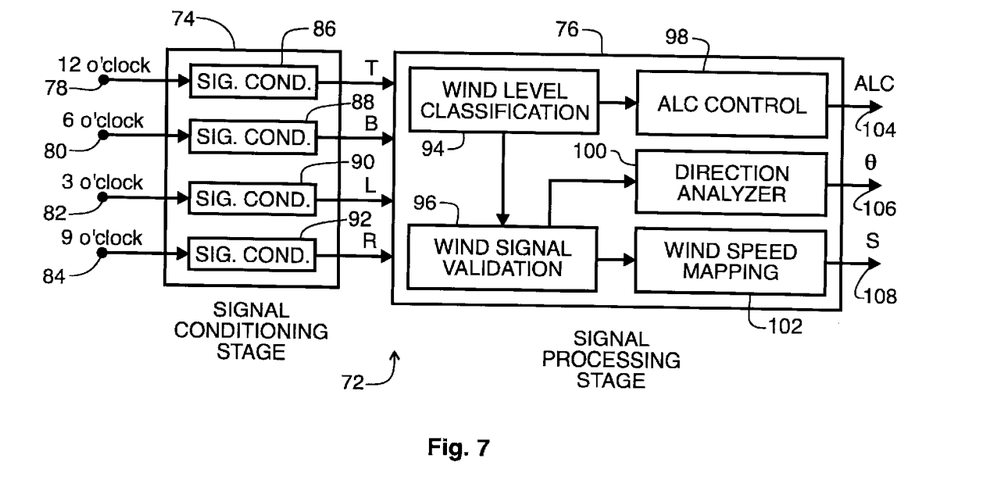
FIG. 7 is a digital signal conditioning diagram for a golf wind gauge in an illustrative embodiment of the present invention.

Reference is directed to FIG. 7, which is a digital signal data processing diagram 72 for a golf wind gauge in an illustrative embodiment of the present invention. The diagram 72 is divided into two blocks of functions, the signal conditional stage 74 and the signal processing stage 76. Both stages are accomplished in the illustrative embodiment by implementation of software and hardware within a digital signal processor in combination with analog to digital converters. The signal condition stage receives the four conditioned audio signals 78, 80, 82, and 84 from the aforementioned audio signal circuits. Individual signal conditions stages 86, 88, 90 and 92 operate on the four analog signals. Initially, each sensor element analog signal 78, 80, 82 and 84 is digitally sampled at 500 samples per second and quantized to 8-bits of resolution by an analog to digital converter. For every sampling instant, the current sample output and the last sixty-three samples of each channel are added to a 32-bit short window sum. Therefore, one 32-bit short window sum is available at each two millisecond sampling interval. Then, for each channel, 256 consecutive 32-bit short window sums are further added together. These sums are the output of the signal conditioning stage that is coupled to the signal processing stage 76. The sums are indicative of signal magnitude over the summed sampling intervals. The four output values of the four sensor element inputs from twelve o'clock, three o'clock, six o'clock and nine o'clock after signal conditioning are denoted by T, B, L and R respectively in FIG. 7.

Figure 8:
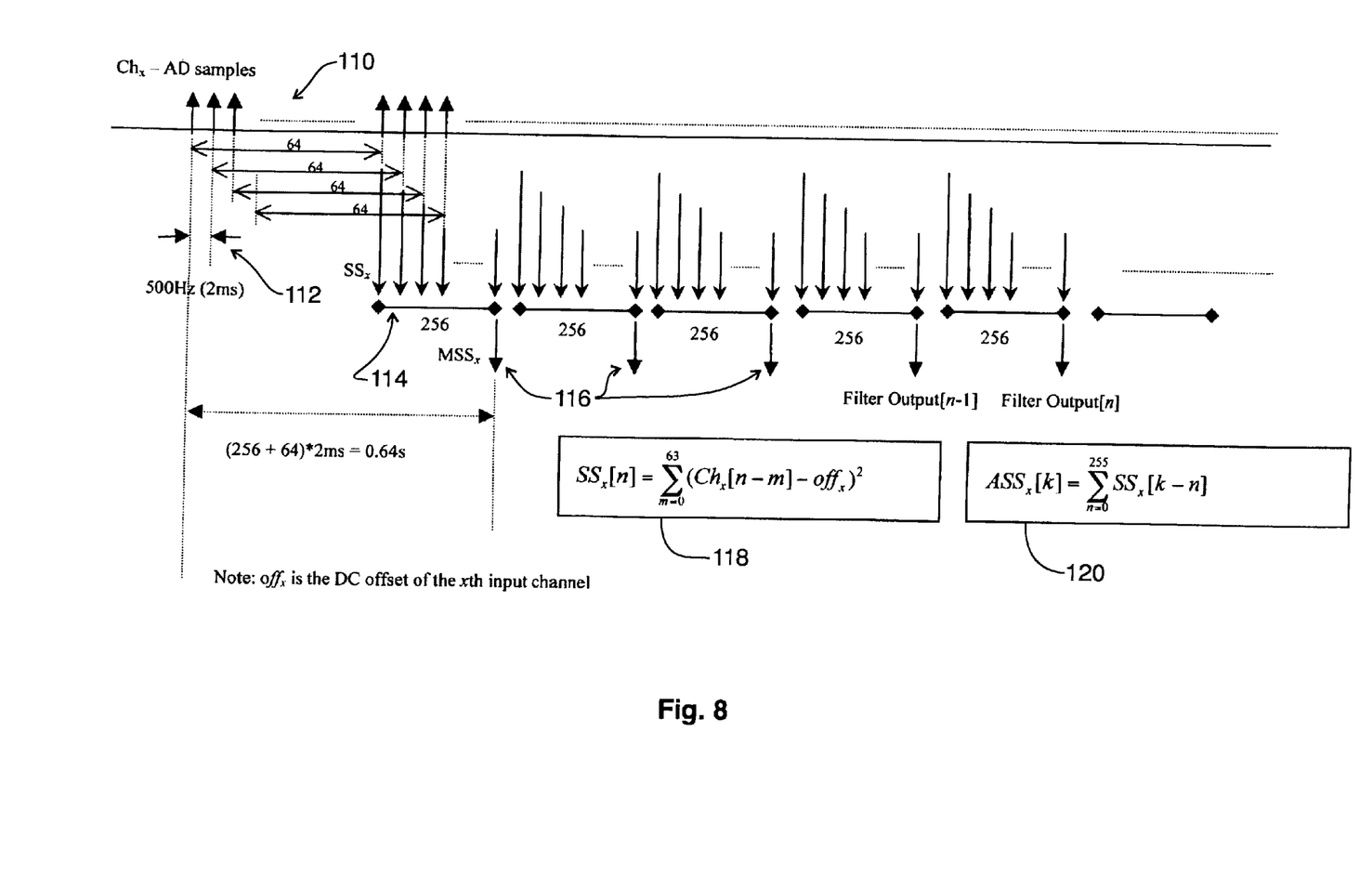
FIG. 8 is a digital signal conditioning timing diagram for a golf wind gauge in an illustrative embodiment of the present invention.

To better appreciate the timing relationships and summations occurring in the signal conditioning stage 74 in FIG. 7, reference is now directed to FIG. 8, which illustrates the timing and summing aspects of the operation. The individual channels are sampled 110 at 500 samples per second. Each two millisecond sampling window 112 defines a time when the present and previous sixty-three sampling instants are summed in the short window interval 114. As the short window sums accumulate, 256 are added to form the accumulated short sums 116. The mathematical expression of the short sum for each channel appears in box 118, and a mathematical expression of the accumulated short sums for each channel appear in box 120.

Referring again to FIG. 7, and the signal processing stage 76 in particular, the data is further processed as follows. The signal processing stage 76 accepts four input accumulated sum values T, B, L, and R from the outputs of the signal conditioning stage 74. The accumulated sums represent the wind pressure level, or energy level, of the measured signals. These data are processed to calculate and produce the information needed for displaying the ultimate outputs in the golf wind gauge illustrative embodiment. The signal processing stage consists of five functional blocks. These include wind level classification 94, automatic level control ('ALC') 98, wind signal validation 96, wind speed mapping 102, and wind direction analysis 100. These functions will now be discussed in turn.

Wind level classification 94 is necessary to determine the total energy level of the wind. This information is useful in setting the gain adjustment to normalize the signal level to determine whether a minimum threshold wind level exists to enable an accurate measurement, and other purposes as will become evident. The first action is to sum the energy levels of each channel to determine the total energy level, E, as follows:

$$E = T + B + L + R \qquad \text{Eqn. 1}$$

The total energy level, E, is compared with plural pre-defined energy level thresholds. In the illustrative embodiment, there are three pre-defined thresholds, $h_1$, $h_2$ and $h_3$. This comparison classifies the wind class level W∈[Weak, Low, Mid, High] as follows:

$$W = \begin{cases} \text{High} & \text{if } E > h_3 \\ \text{Mid} & \text{if } h_2 < E < h_3 \\ \text{Low} & \text{if } h_1 < E < h_2 \\ \text{Weak} & \text{if } E < h_1 \end{cases} \qquad \text{Eqn. 2}$$

If the wind level, W, is classified as Weak, then there is insufficient energy to make an accurate wind measurement. In the illustrative embodiment, this means there is no significant wind to affect a golf swing, so no recommendation is made and the measurement process is terminated. On the other hand, if W is otherwise classified, then the process continues and a suitable gain adjustment is output in the ALC control function 98. An ALC signal 104 is coupled to the gain adjustment stage (item 64 in FIG. 6).

Continuing with the description of the signal processing stage 76 functions, a test is made to determine if the current wind classification differs from the previous. When this comparison is made, it is expected that the two classifications will be the same for two adjacent accumulated short sum sets. This implies that a consistent wind pressure has existed during the brief sampling period, and that an external noise source was unlikely to have affected the measurement. Thus, if the current wind class is different from the previous, the current measurement cycle will be terminated, and, the system awaits another measurement attempt by the user. Assuming the classifications are the same, the signal processing actions continue.

The next signal processing function is the wind signal validation function 96. This function is necessary to eliminate the case where an apparent signal exists, because Equation 1 and Equation 2 have been satisfied, but the energy present is due to a noise source and not wind. Essentially, the processing stage is looking for a differential in the four signals, which is indicative of a directional energy source. Of course, wind is a directional energy source. A wind signal is validated and therefore measurable, in the illustrative embodiment, if the following two cases are satisfied:

$$\text{If } W = \text{Low and } (|T-B| > d_v \text{ or } |L-R| > d_h) \qquad \text{Eqn. 3}$$

or if W is not equal to Low, both $$(|T-B| > d_v \text{ or } |L-R| > d_h) \text{ and}$$

$$(|T-B| > P_v \cdot \max(T,B) \text{ or } |L-R| P_h \cdot \max(L, R)) \qquad \text{Eqn. 4}$$

must be satisfied, where $d_v$, $d_h$, $P_v$ and $P_h$ are pre-defined thresholds. If neither test succeeds, then the wind signal is not validated and the process terminates. Otherwise, the process continues to the next signal processing stage 76 function.

Having determined that sufficient wind pressure exists and that the data represents valid wind criteria and not noise or other sound, the signal processing stage proceeds with the wind direction analysis function 100. Direction analysis begins by determining which segment, or quadrant in the illustrative embodiment, the wind is impinging upon. To do this, the function compares the magnitudes of the four summed signals, as follows:

If T>B and if R>L, then set to first quadrant (12 to 3 o'clock). Eqn. 5

If T<B and if R>L, then set to second quadrant (3 to 6 o'clock) Eqn. 6

If T<B and if R<L, then set to third quadrant (6 to 9 o'clock). Eqn. 7

Otherwise set to fourth quadrant (9 to 12 o'clock).

Having defined the quadrant, or segment, that the wind is impinging upon, then the process calculates the difference between two principle axes, as follows:

$$R = \frac{\max(|T-B|, |L-R|) \cdot 100}{\min(|T-B|, |L-R|)} \qquad \text{Eqn. 8}$$

To deal with the case where the wind is impinging directly upon a single channel sensor, the following test is made:

If R<a defined threshold $f$ Eqn. 9

0° deviation from the dominant axis is concluded.

Otherwise a thirty-degree deviation from the dominant axis is concluded. The decision to select thirty degrees as the increment of deviation from the dominant axis is suitable for a golf wind gauge where a high degree of directional precision is not required. Those skilled in the art will appreciate that higher accuracy can be readily implemented by defining more thresholds at closer angular resolutions. Based on the determined quadrant, the deviation value in Equation 9, and the maximum from Equation 8, one of the twelve possible direction angles θ is found. The direction analyzer function 100 outputs the relative angle θ 106 for subsequent processing and output to the display.

The final function of the signal processing stage 76 is the wind speed mapping function 102. Based on the magnitude E from Equation 1 and the wind class W from Equation 2, a pre-stored mapping table is selected and recalled from a memory in the controller. By the comparing the thresholds with the entry stored in the selected table, the actual wind speed S is determined. The resolution of the wind speed has the same precision as the gradient of threshold values that comprises the table. The wind speed S is output 108 from the signal processing stage 76.

Figure 9:
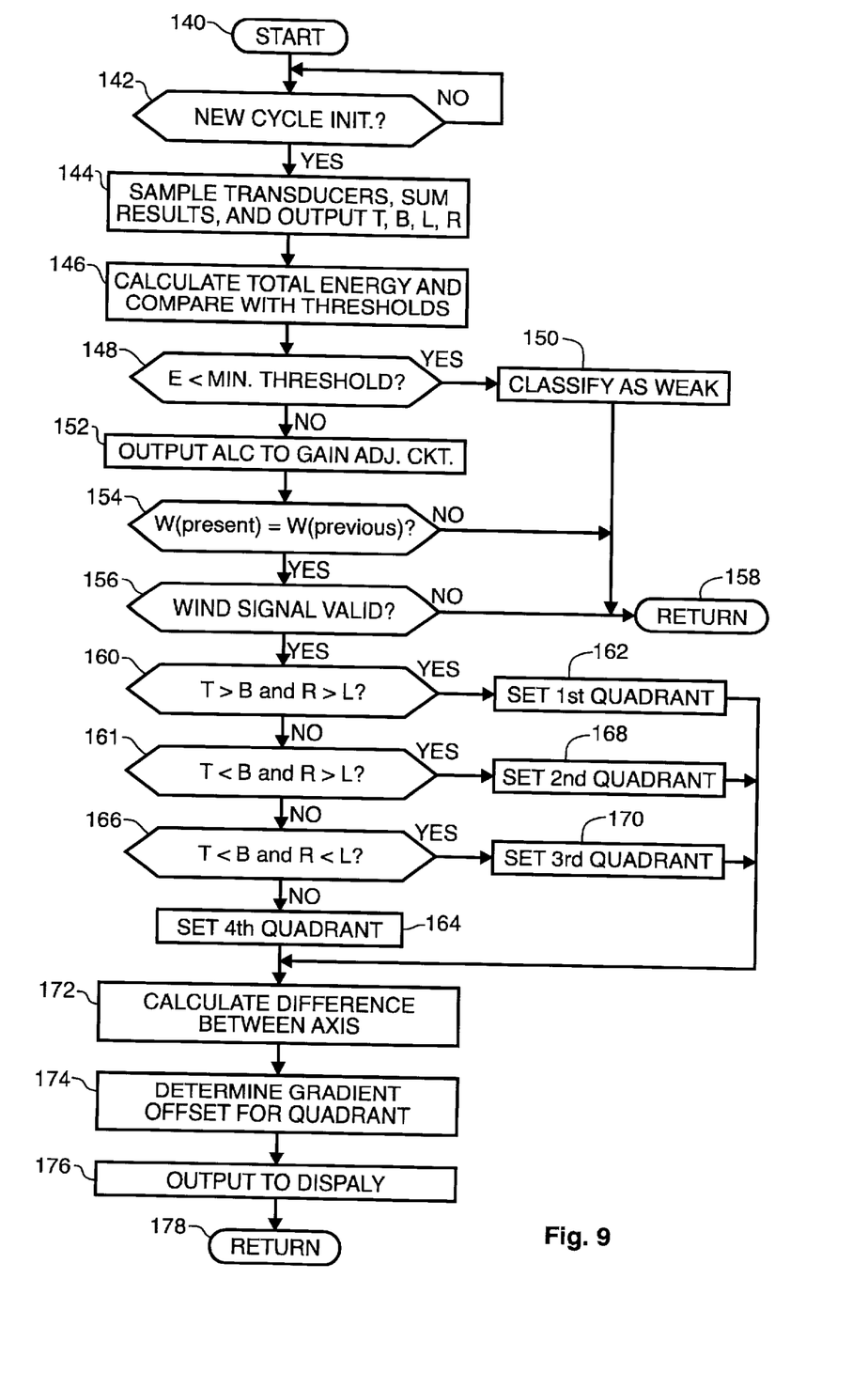
FIG. 9 is a processing flow diagram for a golf wind gauge in an illustrative embodiment of the present invention.

Reference is directed to FIG. 9, which is a processing flow diagram for a golf wind gauge in an illustrative embodiment of the present invention. The process illustrated in FIG. 9 tracks the signal conditioning and signal processing functions described with respect to FIG. 7. The process in FIG. 9 starts at step 140 and proceeds to step 142 where the controller tests to determine if the user has initiated a new measurement cycle. If the user has, flow proceeds to step 144. At step 144 the controller samples the microphone transducers, sums the results and outputs the T, B, L, and R signals to the signal processing stage. At step 146, the controller calculates the total energy, E, and compares it with the total energy thresholds. At step 148, the test to determine if the minimum threshold has been met is made. If the minimum threshold is not met, then the signal is classified as weak at step 150 and the process returns 158 without producing a wind measurement. On the other hand, at step 148, if the signal is greater than the minimum threshold (i.e., weak), then the ALC circuit controls the gain via the gain circuit at step 152. At step 154, the present wind level is compared to the previous wind level in the wind validation process. If they are not equal, indicating a problem in the measurement process, then the process returns at step 158. On the other hand, at step 154, if the measurements are equal, then flow continues to step 156.

At step 156, the wind validation process is accomplished. If the wind signal is not validated, then the process terminates and returns at step 158. On the other hand, at step 156, if the wind signal is valid, then flow proceeds to step 160 to begin the quadrant, or segment, determination process. At step 160, the T>B or R>L test is made and if it is true then the first quadrant is set at step 162 and flow proceeds to step 172. On the other hand, at step 160, if the test is false, the T<B or R>L test is made at step 161 and if it is true then the second quadrant is set at step 168 and flow proceeds to step 172. On the other hand, at step 161, if the test is false, the T<B or R<L test is made at step 166 and if it is true then the third quadrant is set at step 170 and flow proceeds to step 172. On the other hand, at step 166, if the test is false, the forth quadrant is set at step 164 and flow proceeds to step 172. Ultimately, flow reaches step 172 with the wind quadrant having been defined. This, at step 172, the difference in wind pressure between the two axes adjacent to the selected quadrant is calculated. The gradient offset and wind speed for the quadrant are determined at step 174. The wind speed and direction information are processed and output to the display at step 176. The process returns at step 178, to await another user activation cycle.

Figure 10:
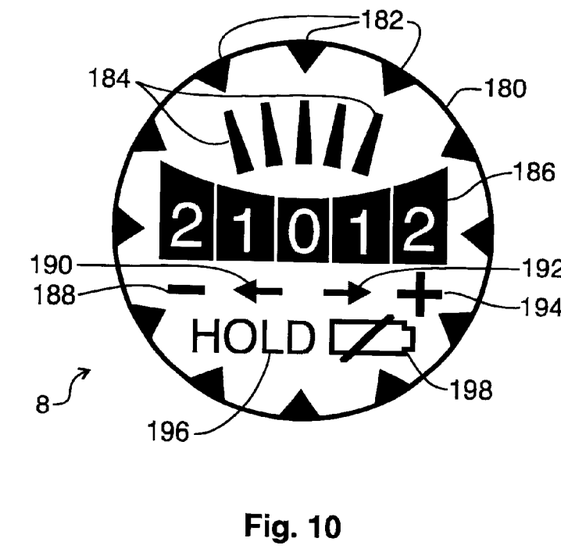
FIG. 10 is a drawing showing all of the display icons for a golf wind gauge in an illustrative embodiment of the present invention.

Reference is directed to FIG. 10, which is a drawing showing all of the display icons for a golf wind gauge in an illustrative embodiment of the present invention. The display 8 is a liquid crystal display with plural individual icons that can be individually activated by the controller in the illustrative embodiment. The display 8 comprises and outer ring 180 that represents the compass of directions that the wind may come from. Twelve wind direction icons 182 are spaced at thirty-degree intervals about the compass 180. In operation, the one wind direction icon 182 that corresponds to the actual wind direction is activated. A battery icon 198 is provided that is activated to indicate a low battery reserve power condition. A "HOLD" 196 icon is provided that is activated to indicate that a present display configuration indicates the results of the last wind measurement and calculation process. Five golf swing direction icons 184 are provided that are individually activated to indicate and adjustment to the angle that the golf swing should be varied by. The center icon indicates no adjustment to the swing angle. The left and right pairs indicate two different degrees of angle adjustment, depending upon the magnitude of the crosswind present and the direction from which is comes. The golf club size recommendation is accomplished using the five numerical icons 186 that range as "2-1-0-1-2", the left arrow icon 190, the right arrow icon 192, the plus symbol icon 194, and the minus symbol icon 188. In operation, a head wind speed in the range from zero to eight miles per hour will result in the activation of the "0" icon 186. This indicates that no golf club adjustment is recommended. If the head wind is in the eight to thirteen miles per hour range, then the right "1" icon 186, the plus icon 194 and the right arrow icon 192 will be activated. This indicates to the user that a one club size increase is recommended for the head wind conditions. In the case of a tail wind in the eight to thirteen miles per hour range, the left "1" icon 186, the left arrow icon 190, and the minus icon 188 will be activated, indicating a minus one club size recommendation. In the case where the head wind or tail wind exceeds thirteen miles per hour, then the same display scenarios are used, except the corresponding "2" icon 186 is activated, indicating a two club adjustment.

Figure 11:
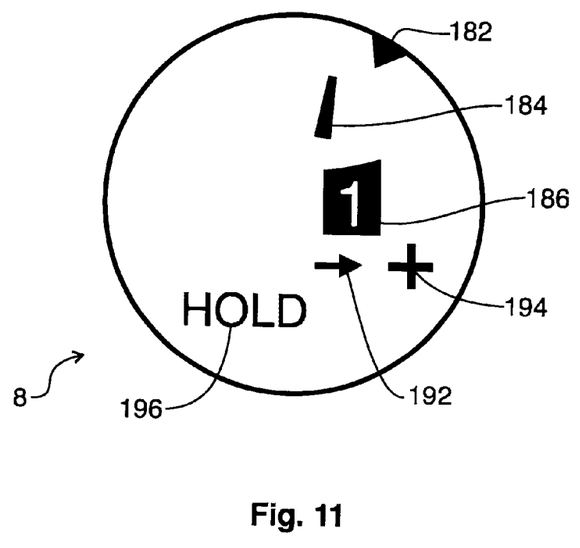
FIG. 11 is a drawing of a typical display read-out for a golf wind gauge in an illustrative embodiment of the present invention.

FIG. 11 is a drawing of a typical display read-out for the golf wind gauge in operation. The display 8 includes the outer compass ring with the wind direction icon 182 activated to show the direction of the actual wind. The golf swing direction icon 184 is active, indicating a slight angular adjustment to the right of the reference direction. The right "1" club adjustment icon 186 is activated together with the right arrow icon 192 and the plus icon 194. This indicates to the user a recommendation to select one club larger size than the golf shot would otherwise require. Finally, the HOLD icon 196 is active, indicating that the present reading is held from the last measurement.

Figure 12:
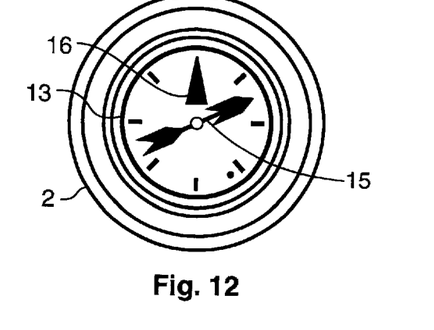
FIG. 12 is a top view of a temperature and wind gauge in an illustrative embodiment of the present invention.

Another embodiment of the present invention is that of a temperature and wind gauge. Reference is directed to FIG. 12, which shows that in this embodiment a magnetic compass 13 having needle 15 is added to the top of the gauge. In addition, a temperature sensor 41, such as a thermistor or thermocouple, is coupled to controller 38 as shown in FIG. 4. Temperature sensor 41 is placed inside cylindrical upper portion 20 of the housing shown in FIGS. 1 and 3 and the plural vent openings 6 that are ornamental in the golf wind gauge are actual openings in this embodiment so that the ambient air can reach temperature sensor 41. To operate the temperature and wind gauge the user first aligns the north end of compass needle 15 with direction reference arrow 16 shown in FIG. 12, thus aligning the gauge to magnetic north, and then pushes button 10 shown in FIGS. 1 and 3 (shown as input actuator 40 in FIG. 4) which initiates the wind and temperature readings and calculations. In this embodiment of the wind gauge, the display 8, refer to FIGS. 1 and 3, has an 'N' for north at the 12 o'clock position, an 'E' for east at the 3 o'clock position, an 'S' for south at the 6 o'clock position and a 'W' for west in the 9 o'clock position and the absolute direction of the wind is indicated by displaying one of the wind direction icons 182 shown in FIGS. 10 and 11. The wind speed is displayed as a numeric value as are the temperature and the chill factor which is a function of the wind speed and temperature or the temperature as corrected for the chill factor is displayed. The temperature as corrected for the chill factor is a still-air temperature that would have the same cooling effect on exposed human flesh as a given combination of temperature and wind speed. In a particular embodiment, the wind speed, temperature and chill factor (or temperature corrected for the chill factor) are all displayed on display 8 simultaneously. In another embodiment, the wind speed, temperature and chill factor are each displayed separately in response to consecutive pushes of button 10 with an indication ("mph", "deg F", and "chill") of what parameter is being displayed. In the embodiment where only one numeric parameter is displayed at a time, the user indicates that a reading is to be initiated by holding down the button 10 for a long time and cycles through the wind speed, temperature and chill factor readings by pressing button 10 for a short time.

In addition to the above embodiments, the present invention may be advantageously employed in any activity that is subject wind velocity and/or wind direction with the display being modified to display its readings in parameters that are relevant to the activity, such as the golf club strength adjustment and golf swing direction adjustment indicators used in the golf wind gauge embodiment. Other such activities include, but are not limited to, hunting (pistol, rifle, shot gun), archery, sailing, boating, skiing (snow and water), sky diving, wind surfing, para sailing, hang gliding, tennis, volley ball, fire fighting, model plane flying, model rocketry and kite flying. For example, in the case of model rocketry, the display could display the degrees off vertical into the wind the rocket is to be launched and the motor size to use and in the case of kite flying, the display could display the kite type and/or line strength to use.

Thus, the present invention has been described herein with reference to particular embodiments for particular applications. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A wind gauge, comprising:
   a first microphone positioned to engage wind pressure from a first relative direction;
   a second microphone positioned to engage wind pressure from a second relative direction, and
   a controller coupled to receive a first audio signal from said first microphone and a second audio signal from said second microphone, said controller operable to compare said first audio signal and said second audio signal with plural threshold values, representative of wind pressure levels, to determine a first wind pressure level incident upon said first microphone and a second wind pressure level incident upon said second microphone.

2. The apparatus of claim 1, further comprising:
   a memory having said plural threshold values stored therein, and wherein
   said controller is coupled to recall said plural threshold values from said memory.

3. The apparatus of claim 1, further comprising:
   a filter having an input coupled to receive said first audio signal from said first microphone and an output that couples a frequency limited portion of said first audio signal to said controller.

4. The apparatus of claim 3 wherein said filter is a low-pass filter.

5. The apparatus of claim 4 wherein said low-pass filter has a corner frequency of approximately eighty Hertz.

6. The apparatus of claim 1 wherein said microphone is a condenser microphone.

7. The apparatus of claim 1 wherein said plural threshold values are correlated to wind speeds.

8. The apparatus of claim 7 wherein said plural threshold values are organized as a wind speed map.

9. The apparatus of claim 1 wherein said controller is a digital signal processor.

10. The apparatus of claim 9, further comprising:
    an analog to digital converter coupled to digitize said first audio signal and output a digital representation of said first audio signal to said digital signal processor.

11. The apparatus of claim 1, further comprising:
    a display coupled to said controller to display an indicia of said first wind pressure level.

12. The apparatus of claim 1, further comprising:
    a gain stage coupled between said microphone and said controller and operable to control the gain of said first audio signal, and wherein
    said controller is operable to determine the signal level of said first audio signal and further operable to control said gain stage to adjust the gain of said first audio signal.

13. The apparatus of claim 1, further comprising
    a housing supporting said first microphone and said controller, and wherein
    said housing has a direction indicator thereon which establishes the reference for said first relative direction.

14. The apparatus of claim 1, further comprising:
    a third microphone positioned to engage wind pressure from a third relative direction;
    a fourth microphone positioned to engage wind pressure from a fourth relative direction, and wherein
    said controller is further coupled to receive a third and fourth audio signal from said third and fourth microphones, and operable to compare said third and fourth audio signals with said plural threshold values to determine third and fourth wind pressure levels incident upon said third and fourth microphones, and wherein
    said first, second, third, and fourth relative direction are positioned equidistant about a circle, thereby defining four quadrants of directions therebetween, and wherein
    said controller is operable to compare said first, second, third, and fourth wind pressure levels and determine which of said four quadrants the wind pressure is impinging upon.

15. The apparatus of claim 1 wherein said controller processes said first audio signal and said second audio signal to produce a first signal magnitude and a second signal magnitude, respectively.

16. The apparatus of claim 15 wherein said controller repetitively samples said audio signals over a predetermined window of time to establish said first signal magnitude and said second signal magnitude.

17. The apparatus if claim 15 wherein said controller sums said first signal magnitude and said second signal magnitude to determine if a minimum total signal magnitude exists, thereby indicating a minimum measurable wind pressure.

18. The apparatus of claim 15 wherein said controller compares said first signal magnitude and said second signal magnitude to determine if a minimum threshold signal magnitude difference exists, thereby indicating the presence of wind.

19. The apparatus of claim 15 wherein said controller defines a first wind vector as a combination of said first signal magnitude and said first relative direction, and defines a second wind vector as a combination of said second signal magnitude and said second relative direction, and, said controller is operable to calculate a resultant wind vector based on said first wind vector and said second wind vector.

20. The apparatus of claim 19, further comprising:
    a housing supporting said microphones and said controller, and wherein
    said housing has a direction indicator thereon which establishes the reference for said relative directions, and wherein
    said controller utilizes said resultant wind vector to calculate a head wind pressure and output a golf club selection adjustment factor.

21. The apparatus of claim 19, further comprising:
    a housing supporting said microphones and said controller, and wherein
    said housing has a direction indicator thereon which establishes the reference for said relative directions, and wherein said controller utilizes said resultant wind vector to calculate a crosswind pressure and output a golf swing direction adjustment factor.

22. The apparatus of claim 19, further comprising:
a housing supporting said microphones and said controller, and wherein
said housing has a direction indicator and a magnetic compass thereon for allowing alignment of said apparatus to magnetic north, and wherein
said controller utilizes said resultant wind vector to calculate and output the direction of the wind relative to magnetic north.

23. The apparatus of claim 1 further comprising:
a temperature sensor coupled to said controller for sensing ambient temperature, and wherein
said controller is operable to read the ambient temperature and calculate a wind chill factor based on said ambient temperature and said first wind pressure level.

24. A wind gauge, comprising:
plural microphones;
a housing supporting said plural microphones at positions spaced along a compass to engage wind pressure from plural relative directions that define plural segments of the compass therebetween, said housing having a reference direction indicator;
plural low-pass filters coupled to receive plural audio signals from said plural microphones and output plural frequency limited portions of said plural audio signals;
plural gain stages coupled to receive and control the gain of said plural signals;
a memory having stored therein plural threshold values, correlated to wind speed;
plural analog to digital converters coupled to digitize said plural signals and output digital representations thereof;
a controller coupled to receive said digital representations of said plural signals and determine the signal levels thereof by repetitively sampling said plural signals over predetermined windows of time, and operable to control said plural gain stages to adjust the gain of said plural signals, and, said controller coupled to recall said plural threshold values from said memory and compare said plural signals therewith to determine plural wind pressure levels incident upon said plural microphones, and wherein
said controller sums said plural signals to determine if a minimum total signal magnitude exists, thereby indicating a minimum measurable wind pressure, and wherein
said controller compares said plural signal levels in pair combinations to determine if a minimum threshold signal magnitude difference exists, thereby indicating the presence of wind, and within which of said plural compass segments the wind is impinging upon, and wherein
said controller defines two wind vectors as combinations of the two wind pressure levels and the two relative directions adjacent to the one of said plural compass segments into which the wind impinges, and, said controller is operable to calculate a resultant wind vector based on said two wind vectors;
a display coupled to said controller, having an indicia of wind direction, and wherein said controller activates said indicia of wind direction in accordance with the direction of said resultant vector.

25. The apparatus of claim 24 for use as a golf wind gauge, and wherein:
said display further comprises an indicia of golf club strength adjustment, and an indicia of golf swing direction adjustment, and wherein
said controller activates said indicia of golf club strength adjustment in accordance with a component of said resultant vector that is aligned with said reference direction, and activates said indicia of golf swing direction adjustment in accordance with a component of said resultant vector that is orthogonal to said reference direction.

26. A method of measuring wind by utilizing microphones to sense wind pressure, comprising the steps of:
positioning a first microphone to engage wind pressure from a first relative direction;
positioning a second microphone to engage wind pressure from a second relative direction, and
comparing a first audio signal output by the first microphone and a second audio signal from the second microphone with plural threshold values, representative of wind pressure levels, to determine a first wind pressure level incident upon the first microphone and a second wind pressure level incident upon said second microphone.

27. The method of claim 26 further comprising the step of recalling said plural threshold values from a memory.

28. The method of claim 26, further comprising the step of filtering said first audio signal to output a frequency limited portion thereof to said comparing step.

29. The method of claim 28 wherein said filtering step employs a low-pass filter.

30. The method of claim 29 wherein the low-pass filter has a corner frequency of approximately eighty Hertz.

31. The method of claim 26 wherein the microphone is a condenser microphone.

32. The method of claim 26 wherein said plural threshold values are correlated to wind speeds.

33. The method of claim 32 wherein said plural threshold values are organized as a wind speed map.

34. The method of claim 26 wherein said comparing step is accomplished by a digital signal processor.

35. The method of claim 34, further comprising the step of:
digitally sampling said first audio signal.

36. The method of claim 26, further comprising the step of displaying an indicia of said first wind pressure level.

37. The method of claim 26, further comprising the steps of:
determining the signal level of said first audio signal, and
controlling a gain stage to adjust the gain of said first audio signal.

38. The method of claim 26 wherein the microphone is fixed in a housing and the housing has a direction indicator disposed thereon, further comprising the step of:
establishing the reference for said first relative direction with respect to the direction indicator.

39. The method of claim 38, further comprising the steps of:
positioning a third microphone to engage wind pressure from a third relative direction, and, positioning a fourth microphone to engage wind pressure from a fourth relative direction, and wherein said first, second, third, and fourth relative direction are positioned equidistant about a circle, thereby defining four quadrants of directions therebetween;

comparing a third and fourth audio signal from the third and fourth microphones with said plural threshold values to determine third and fourth wind pressure levels incident upon said third and fourth microphones, and comparing said first, second, third, and fourth wind pressure levels to determine which of said four quadrants the wind pressure is impinging upon.

40. The method of claim 38, further comprising the step of:

processing said first audio signal and said second audio signal to produce a first signal magnitude and a second signal magnitude, respectively.

41. The method of claim 40 further comprising the step of:

repetitively sampling said audio signals over a predetermined window of time to establish said first signal magnitude and said second signal magnitude.

42. The method if claim 40, further comprising the step of:

summing said first signal magnitude and said second signal magnitude to determine if a minimum total signal magnitude exists, thereby indicating a minimum measurable wind pressure.

43. The method of claim 40, further comprising the step of:

comparing said first signal magnitude and said second signal magnitude to determine if a minimum threshold signal magnitude difference exists, thereby indicating the presence of wind.

44. The method of claim 40, further comprising the steps of:

defining a first wind vector as a combination of said first signal magnitude and said first relative direction;

defining a second wind vector as a combination of said second signal magnitude and said second relative direction, and calculating a resultant wind vector based on said first wind vector and said second wind vector.

45. The method of claim 44 wherein a housing supports said microphones and the housing has a directional indicator disposed thereon which established the reference for said relative directions, further comprising the step of:

calculating a head wind pressure based on said resultant wind vector, and outputting a golf club selection adjustment factor correlated to said head wind pressure.

46. The method of claim 44 wherein a housing supports said microphones and the housing has a directional indicator disposed thereon which established the reference for said relative directions, further comprising the step of:

calculating a crosswind pressure based on said resultant wind vector, and outputting a golf swing direction adjustment factor correlated to said crosswind pressure.

* * * * *